United States Patent
Le et al.

(10) Patent No.: US 11,262,993 B2
(45) Date of Patent: *Mar. 1, 2022

(54) APPLICATION BINARY REWRITING TO REDUCE BINARY ATTACK SURFACE AREA

(71) Applicant: International Business Machines Corporation, Armonk, NY (US)

(72) Inventors: Michael Vu Le, Ossining, NY (US); Ian Michael Molloy, Westchester, NY (US); Jacob Tinkhauser, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/584,237

(22) Filed: Sep. 26, 2019

(65) Prior Publication Data

US 2020/0019392 A1 Jan. 16, 2020

Related U.S. Application Data

(63) Continuation of application No. 15/955,934, filed on Apr. 18, 2018, now Pat. No. 10,545,745.

(51) Int. Cl.
*G06F 8/52* (2018.01)
*G06F 8/41* (2018.01)
*G06F 9/455* (2018.01)
*G06F 21/52* (2013.01)

(52) U.S. Cl.
CPC .............. *G06F 8/52* (2013.01); *G06F 8/4435* (2013.01); *G06F 9/45516* (2013.01); *G06F 21/52* (2013.01); *G06F 2221/033* (2013.01)

(58) Field of Classification Search
CPC ...... G06F 8/52; G06F 8/4435; G06F 9/45516; G06F 21/52; G06F 2221/033
See application file for complete search history.

(56) References Cited

U.S. PATENT DOCUMENTS

| 9,250,937 | B1 | 2/2016 | Franz et al. | |
| 9,489,517 | B2 | 11/2016 | Murthy | |
| 10,545,745 | B2* | 1/2020 | Le | G06F 9/45516 |
| 2003/0182653 | A1* | 9/2003 | Desoli | G06F 9/45504 717/138 |
| 2008/0126865 | A1* | 5/2008 | Lee | G06F 11/3652 714/34 |

(Continued)

OTHER PUBLICATIONS

Engel, Victor. "How to restore previous version of code in Xcode." StackOverflow, Jan. 12, 2013, stackoverflow.com/questions/14298474/how-to-restore-previous-version-of-code-in-xcode. Accessed Oct. 24, 2020. (Year: 2013).*

(Continued)

*Primary Examiner* — Wei Y Zhen
*Assistant Examiner* — Brahim Bourzik
(74) *Attorney, Agent, or Firm* — Harrington & Smith

(57) ABSTRACT

Unused instructions and no longer used instructions in a target application binary are determined. The target application binary is rewritten before and after runtime execution of the target application binary to remove the unused and no longer used instructions to reduce binary attack surface area for the runtime execution of the target application binary. Methods, computer systems, and computer program products are disclosed.

22 Claims, 6 Drawing Sheets

(56) References Cited

U.S. PATENT DOCUMENTS

| | | |
|---|---|---|
| 2011/0145551 A1 | 6/2011 | Wang |
| 2011/0231824 A1 | 9/2011 | Chabbi |
| 2014/0082597 A1 | 3/2014 | Chafi |
| 2015/0143452 A1 | 5/2015 | Hamlen |
| 2016/0021121 A1* | 1/2016 | Cui ............... G06F 21/54 726/1 |
| 2016/0034690 A1 | 2/2016 | Kejriwal |
| 2016/0224790 A1* | 8/2016 | Gupta ............ G06F 21/566 |
| 2016/0328245 A1 | 11/2016 | Hall |
| 2017/0103210 A1 | 4/2017 | Baji-Gal |
| 2018/0004947 A1 | 1/2018 | Li et al. |
| 2018/0077196 A1 | 3/2018 | Itikarlapalli |
| 2018/0349614 A1 | 12/2018 | Ionescu |
| 2019/0042224 A1* | 2/2019 | Caballero de Gea .............. G06F 8/4441 |
| 2019/0042760 A1 | 2/2019 | Gutson |

OTHER PUBLICATIONS

Kellner, Ingmar. "Dead Code Detection." Hello2morrow, Apr. 21, 2015, blog.hello2morrow.com/2015/04/dead-code-detection/. Accessed Oct. 24, 2020. (Year: 2015).*

F. Schuster and T. Holz, "Towards reducing the attack surface of software backdoors", CCS '13 Proceedings of the 2013 ACM SIGSAC conference on Computer & communications security Nov. 4-8, 2013, pp. 851-862.

M. Payer et al., "Fine-grained Control-flow Integrity through Binary Hardening", DIMVA 2015 Proceedings of the 12th International Conference on Detection of Intrusions and Malware, and Vulnerability Assessment—vol. 9148, pp. 144-164 [retrieved Mar. 16, 2018].

S. Das, W. Zhang and Y. Liu, "A Fine-Grained Control Flow Integrity Approach Against Runtime Memory Attacks for Embedded Systems," in IEEE Transactions on Very Large Scale Integration (VLSI) Systems, vol. 24, No. 11, pp. 3193-3207, Nov. 2016.

* cited by examiner

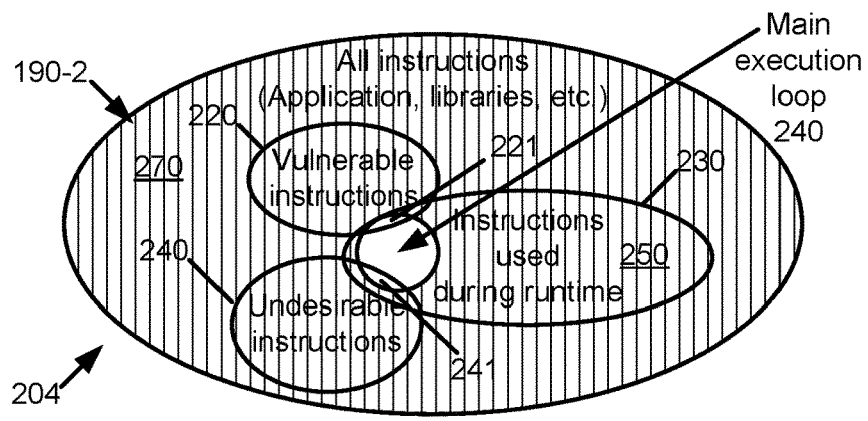
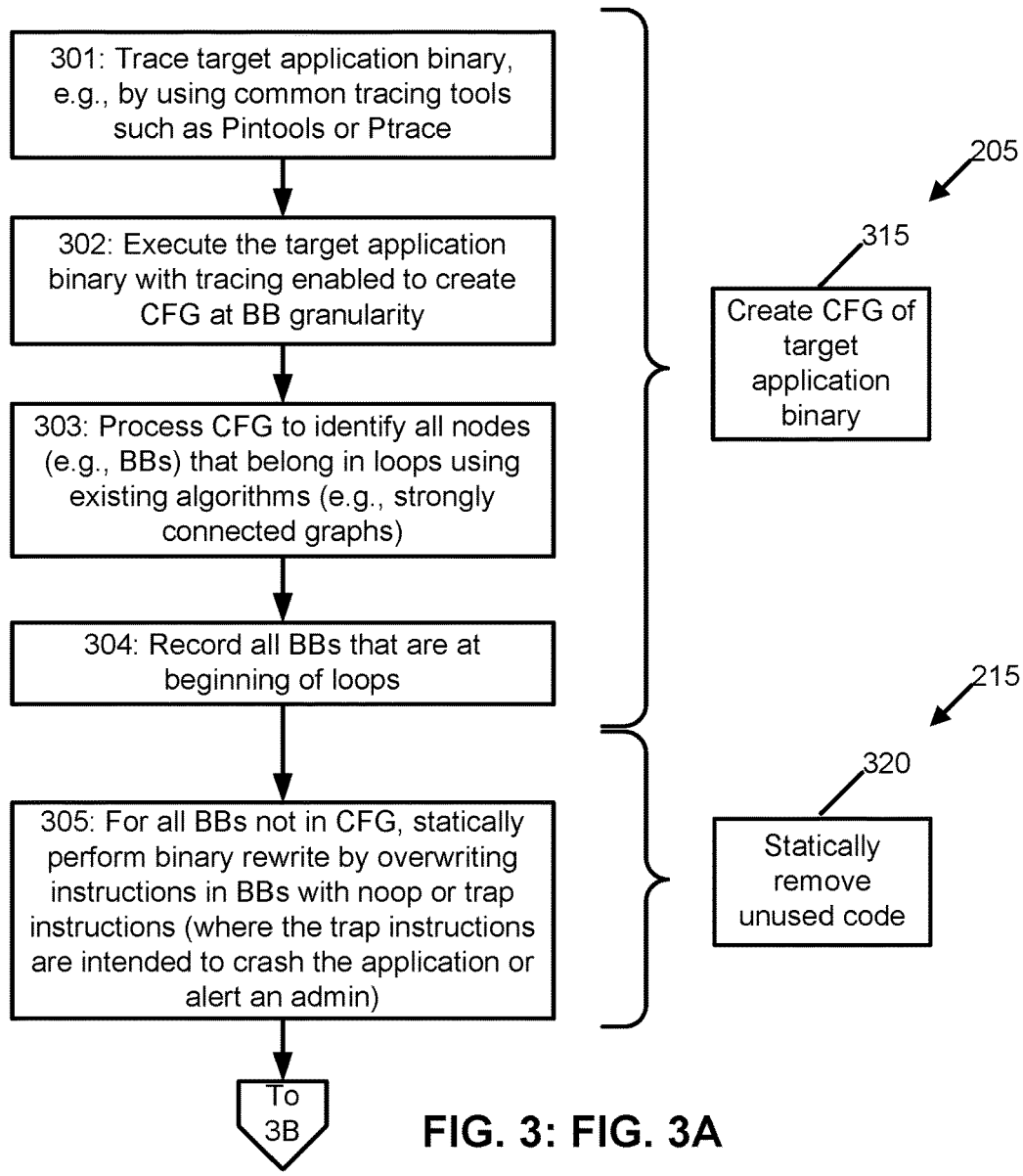
FIG. 2A
FIG. 3: FIG. 3A

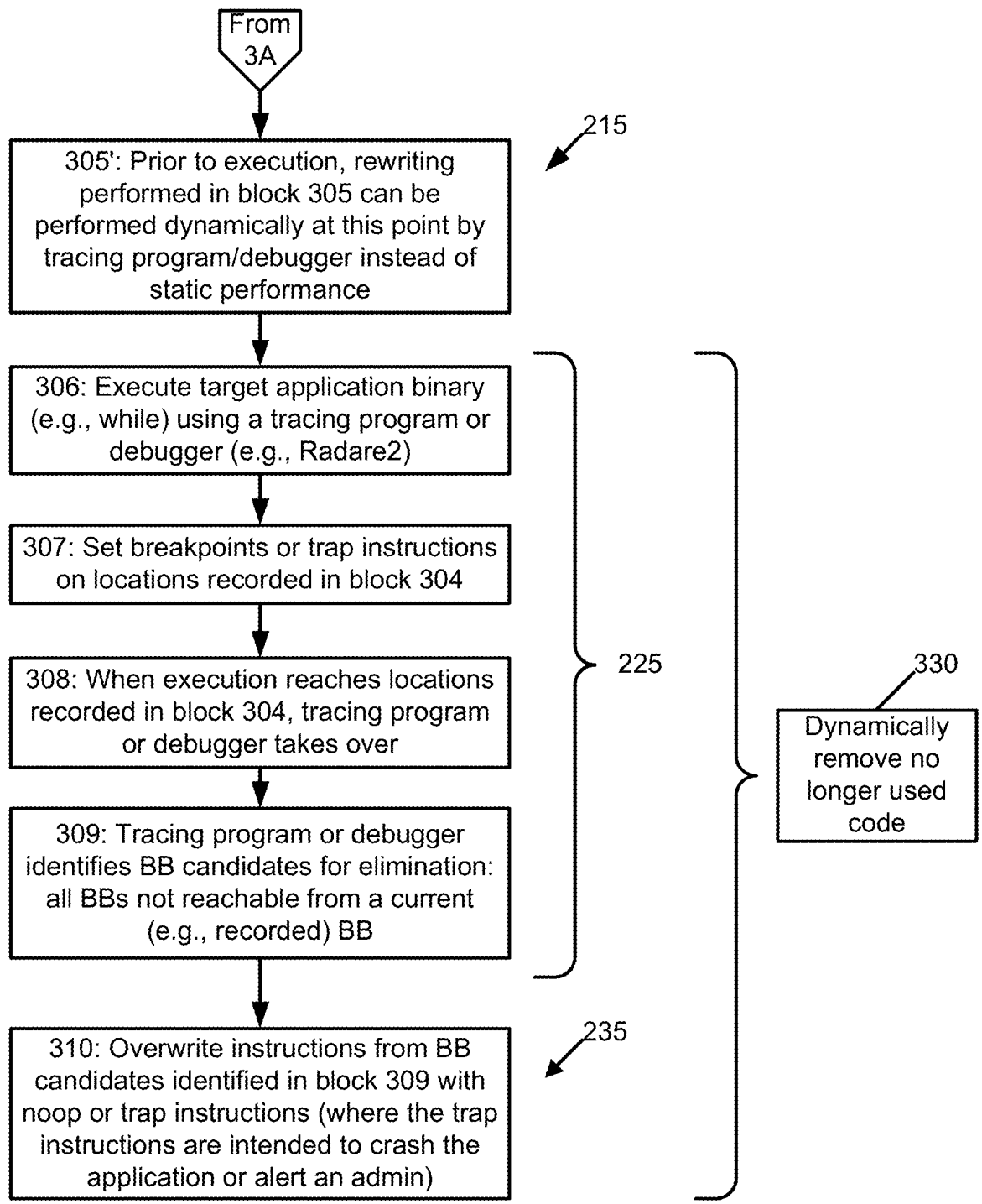
FIG. 3: FIG. 3B

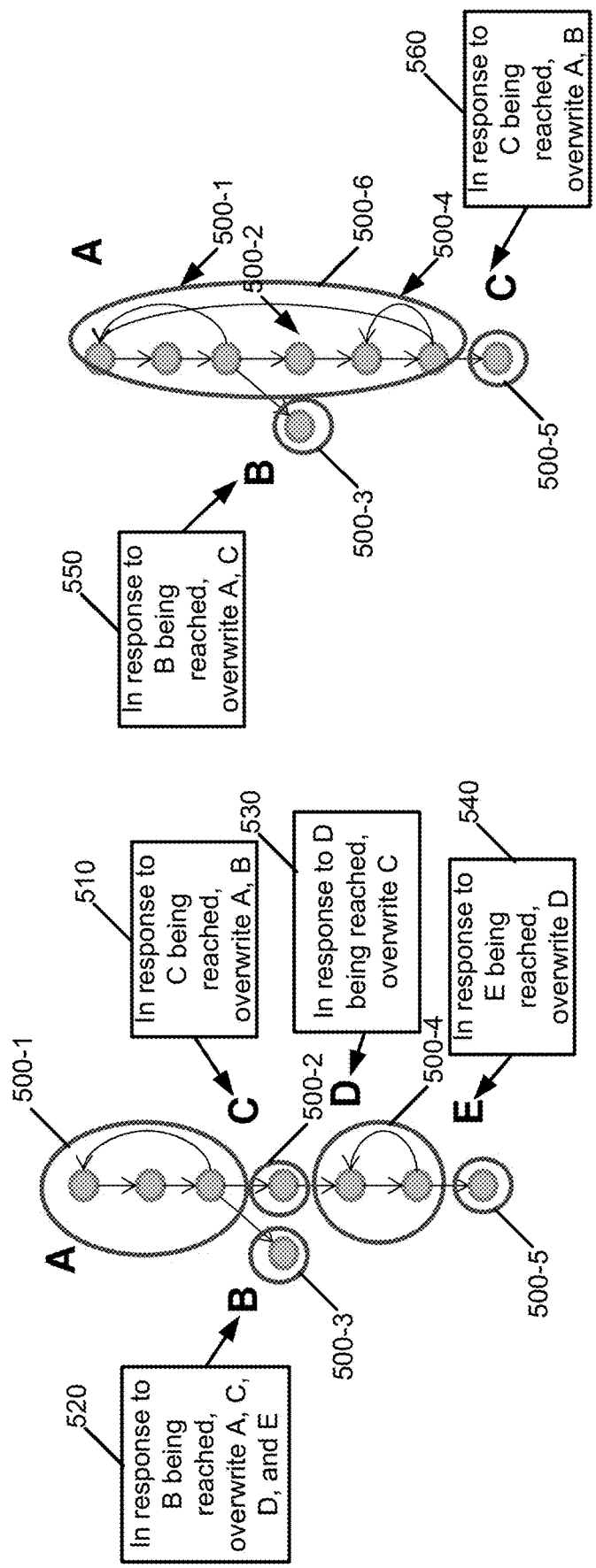

APPLICATION BINARY REWRITING TO REDUCE BINARY ATTACK SURFACE AREA

CROSS-REFERENCE TO RELATED APPLICATIONS

This application is a continuation of U.S. patent application Ser. No. 15/955,934, filed on Apr. 18, 2018, the disclosure of which is incorporated herein by reference in its entirety.

BACKGROUND

This invention relates generally to security exploits on computer systems and, more specifically, relates to application binary rewriting to reduce binary attack surface area.

A code-reuse attack on a computer system is a security exploit that reuses existing instructions in an application to execute arbitrary code on a compromised computer system. Such attacks include return-oriented programming and a variant called jump-oriented programming. In return-oriented programming, an attacker gains control of the call stack to hijack program control flow and then executes carefully chosen machine instruction sequences, called "gadgets", that are already present in the machine's memory. Each gadget typically ends in a return instruction and is located in a subroutine within the existing program and/or shared library code. Chained together, these gadgets allow an attacker to perform arbitrary operations on a machine employing defenses that thwart simpler attacks.

Control-flow hijack is a precursor to a code-reuse attack. Control-flow hijack is a type of attack that makes use of memory corruption to redirect the flow of execution to a location controlled by an attacker. This area may contain existing instructions (thus, the code reuse, which is a focus of the exemplary embodiments described below) or instructions injected by an attacker.

These types of attacks are advanced types of attacks that can be used to circumvent modern security checks and hardening efforts. The more instructions to which an attacker has access, the more likely the success of the attack. The term "binary attack surface area" is used to quantify the amount of instructions to which an attacker has access, and refers to the amount of code, including code in an application and any code that application can access, e.g., in libraries, APIs (application programming interfaces), and the like, that can be accessed/manipulated by an attacker to compromise a system.

It would be beneficial to reduce the binary attack surface area in order to reduce the chance of or prevent these types of attacks.

SUMMARY

This section is meant to be exemplary and not meant to be limiting.

In an exemplary embodiment, a method comprises determining unused instructions and no longer used instructions in a target application binary. The method also comprises rewriting the target application binary before and after runtime execution of the target application binary to remove the unused and no longer used instructions to reduce binary attack surface area for the runtime execution of the target application binary.

In another exemplary embodiment, a computer system is disclosed that comprises one or more memories comprising computer readable code and comprises one or more processors. The one or more processors cause the computer system, in response to retrieval from the one or more memories and execution of the computer readable code, to perform operations comprising: determining unused instructions and no longer used instructions in a target application binary; and rewriting the target application binary before and after runtime execution of the target application binary to remove the unused and no longer used instructions to reduce binary attack surface area for the runtime execution of the target application binary.

In a further exemplary embodiment, a computer program product is disclosed that comprises a computer readable storage medium having program instructions embodied therewith. The program instructions executable by a computer system to cause the computer system to perform operations comprising: determining unused instructions and no longer used instructions in a target application binary; and rewriting the target application binary before and after runtime execution of the target application binary to remove the unused and no longer used instructions to reduce binary attack surface area for the runtime execution of the target application binary.

BRIEF DESCRIPTION OF THE SEVERAL VIEWS OF THE DRAWINGS

FIG. 2A is another version of a Venn diagram of FIG. 2, shown in another example;

FIG. 3, split into FIGS. 3A and 3B, is a block diagram of a flowchart of application binary rewriting to reduce binary attack surface area, in an exemplary embodiment;

FIGS. 5A and 5B are illustrations of loop detection and code elimination, in accordance with exemplary embodiments.

DETAILED DESCRIPTION

Figure 1:
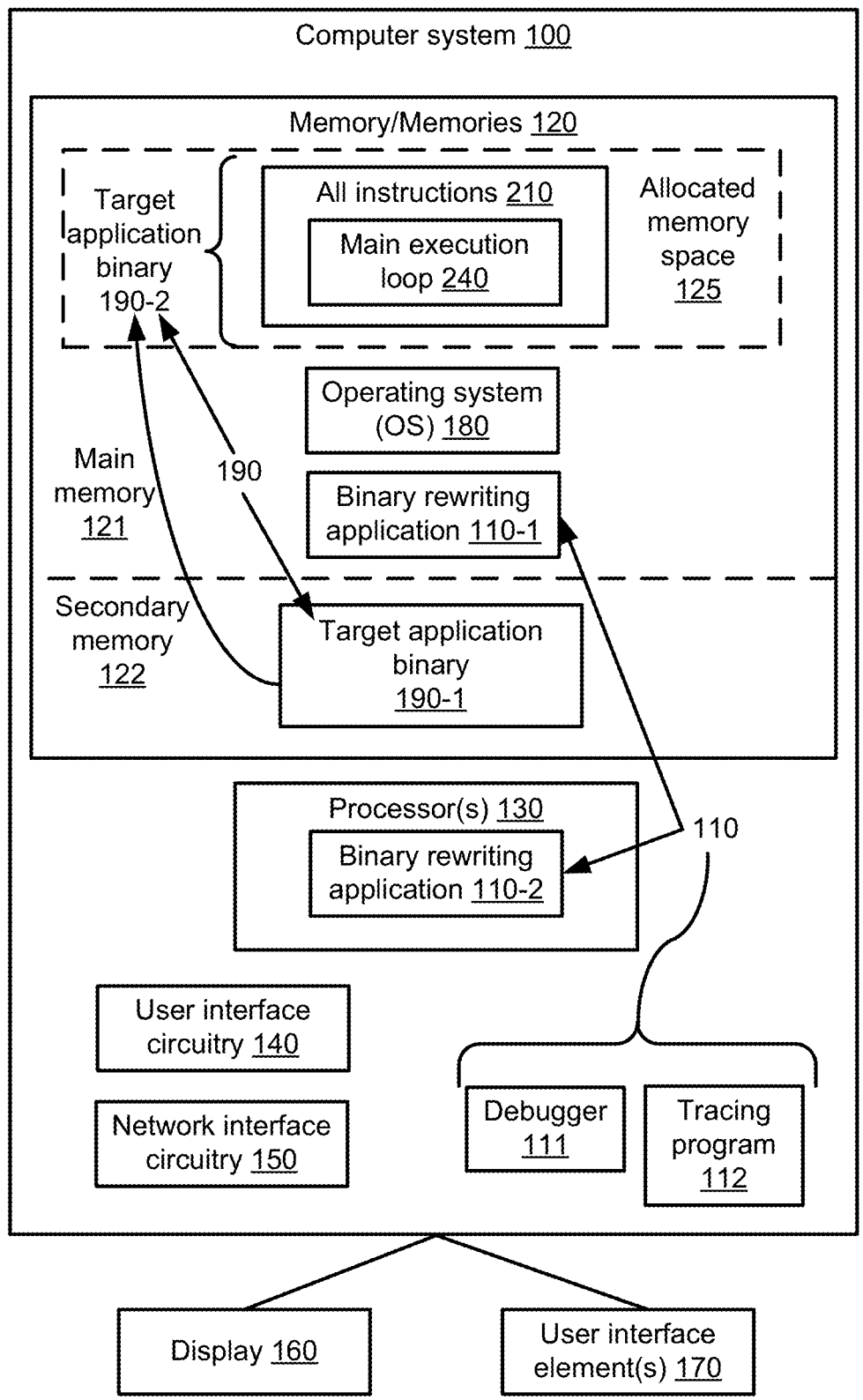
FIG. 1 is a block diagram of a computer system suitable for use with exemplary embodiments.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The following abbreviations that may be found in the specification and/or the drawing figures are defined as follows:

admin administrator
API application programming interface
ASLR address space layout randomization
BB basic block
CFG control flow graph
CFI control flow integrity
CVE common vulnerabilities and exposure
noop no operation
OS operating system
RAM random access memory As stated above, the more code to which an attacker has access, the more likely the success of the attack. It is therefore beneficial to reduce the binary attack surface area in order to reduce the chance of or prevent these types of attacks.

In particular, it is important to remove unused code and no longer used code to reduce the effectiveness of code-reuse attacks by limiting the amount of code available to be used to craft an attack. Unused code includes any application code and/or libraries (APIs) invoked by an application binary during initialization that do not get used again. No longer used code includes previously executed code that should not be accessed again after execution. That is, once a certain program location is reached, that previously executed code should no longer be used.

Exemplary embodiments herein address these issues. In exemplary embodiments, techniques are disclosed to remove from subsequent execution instructions potentially reachable by a target application binary but not used during execution of the target application binary. In other exemplary embodiments, techniques are disclosed for runtime that remove instructions in memory that have been executed and will no longer be used for the duration of the program from the code area of the program. This reduces binary attack surface area so that no longer used instructions cannot be used in a code-reuse attack. These techniques can be applied to any application binary, and do not require source code or recompilation. An application binary is a machine-executable file (e.g., see target application binary 190-2, described below) or memory image (e.g., see target application binary 190-1, described below) containing compiled and linked application source code. It is noted that an application binary is commonly referred to as a "binary", and thus the techniques herein will also refer to binary rewriting as rewriting that occurs on binaries of applications. These techniques also handle false-positives (e.g., removed code that is legitimately needed) gracefully and securely.

Issues with current techniques include the following:

1) ASLR (address space layout randomization) can be circumvented due to the leaking of base addresses; and 2) CFI (control flow integrity) techniques have high performance overhead in practice and not precise enough to prevent circumvention.

As is known, address space layout randomization (ASLR) is a technique for randomizing the starting location of code in order to make it harder for attackers to exploit the application, and control flow integrity (CFI) is a property that restricts control transfers to a fixed known set of locations determined a priori. It should be noted that ASLR and CFI are complementary to the techniques presented herein. By themselves, however, they have problems as indicated and are insufficient to thwart code-reuse attacks.

Another possible conventional technique is Linux (LINUX) kernel_init_and_ro_uninitialized data sections, but this only applies to Linux kernel and requires source code and recompilation. Note that Linux is computer operating system software to facilitate computer use and operation.

There is also Linux kernel specialization which, for a fixed environment and fixed app behavior, reduces functionalities in a kernel by compiling them out. For instance, there is system-wide compaction and specialization of the Linux kernel, e.g., using link-time binary rewriting to configure to remove unused system calls and fix the arguments of known calls. This assumes a fixed environment and fixed applications. There is also quantifiable run-time kernel attack surface reduction, which learns the kernel functions being used and blocks out the rest of the kernel functions. This requires a kernel module and requires hooks into all system calls to do checks. For instance, this can use kprobe for runtime monitoring and check. None of these Linux techniques provide the features described herein.

Advantages of exemplary embodiments herein comprise one or more of the following:

1) The leaking of base addresses in ASLR does not occur;

2) With respect to CFI, the instant techniques have lower performance overhead in practice and are precise enough to prevent circumvention;

3) The instant techniques do not require source code or recompilation;

and/or

4) The instant techniques completely remove instructions from memory to make it impossible for these removed instructions to be used for exploits.

Before proceeding with additional detail regarding exemplary embodiments, it is helpful to address some terminology. Program code will also be referred to as instructions, as program code is a set of instructions. The terms application and program are used interchangeably. Thus, "program code" and "application code" are considered to be the same. Also, "program code" and/or "application code" may be shortened to "code".

Referring to FIG. 1, a block diagram of a computer system 100 is shown that is suitable for use with exemplary embodiments. The computer system 100 comprises one or more memories 120, one or more processors 130, user interface circuitry 140 and network interface circuitry 150. The computer system 100 is connected to (or comprises) a display 160 and one or more user interface elements 170.

The one or more memories 120 comprise a main memory 121 and a secondary memory 122. Main memory 121 (also called "primary" memory) is directly accessible by the one or more processors 130 and is typically volatile memory. The secondary memory 122 differs from main memory 121 in that it is not directly accessible by the one or more processors 120 and is typically non-volatile. A target application binary is generally referred to herein as target application binary 190. However, there is a "file" version of this, shown as target application binary 190-1 stored in secondary memory 122. There is also a "memory" version of this, shown stored in main memory 121 as target application binary 190-2. These can be treated differently, as explained in more detail below, and there may be differences in structure between the two (e.g., elements used for a file system in the secondary memory 122 might not be applicable to the main memory 121).

The main memory 121 in this example comprises all instructions 210, described below in reference to FIG. 2, an operating system (OS) 180, and a binary rewriting application 110-1. The all instructions 210 are all the instructions reachable by a target application binary 190-1. The all instructions 210 comprise a main execution loop 240, also described below in reference to FIG. 2.

The one or more processors 130 comprise binary rewriting application 110-2. The one or more processors 130 are circuitry that causes the computer system 100 to perform the actions described herein. The one or more processors 130 may be general-purpose or special purpose processors (such as application specific integrated circuits), or other circuitry such as programmable logic.

The binary rewriting application 110 is an application that causes the computer system 100 to perform operations for application binary rewriting to reduce binary attack surface area, and may be implemented in one or both of the one or more memories 120 and the one or more processors 130. As part of the one or more memories 120, the one or more processors 130 would access the binary rewriting application 110-1 in the one or more memories 120 and execute the instructions in the application 110-1, in order to cause the computer system 100 to carry out operations. The binary rewriting application 110-2 in the one or more processors 130 can be a representation of instructions fetched from the one or more memories. Alternatively or in addition, the binary rewriting application 110-1 in the one or more processors 130 may be a representation of hardware instructions that are built into the one or more processors 130 and cause the computer system 100 to perform operations when executed.

The binary rewriting application 110 may comprise or have access to and use a debugger 110 and/or a tracing program 112. These are described in more detail below, but are used to analyze and trace target application binary 190 in order to, e.g., determine the all instructions 210 and to help with and enable the application binary rewriting described herein. These are described in more detail below.

The OS 180 controls many of the operations of the computer system 100 and performs memory management and the like. The binary rewriting application 110-1 may be implemented in whole or in part in the OS 180 or implemented separately from the OS 180. The OS 180 assigns an allocated memory space 125 to the target application binary 190-2 (e.g., and therefore to all instructions 210). It is noted that the OS 180 and the other applications described herein would also have allocated memory spaces, but these are not shown. The target application binary 190 is also shown residing in the secondary memory 122 (see 190-1), and the target application binary 190-1 would be loaded into main memory 121, e.g., in the allocated memory space 125 as target application binary 190-2, for subsequent retrieval and execution by the one or more processors 130.

The one or more memories 120 may include non-volatile storage memories (e.g., for secondary memory 122) such as memory sticks, solid state drives, firmware, and/or hard drives, and may include volatile memories (e.g., for main memory 121) such as static RAM, dynamic RAM, registers, and/or cache memory.

The display 160 may be a touch screen or non-touch screen, and the computer system 100 interfaces with the display 160 via the user interface circuitry 140 (e.g., such as through a graphics processing unit, possibly as part of the one or more processors 130). The user interface element(s) 170, if used, could include keyboards, mice, and other user interface elements, and the computer system 100 interfaces with these via the user interface circuitry 140. The network interface circuitry 150 may include one or both of a wired network interface and a wireless network interface.

The computer system 100 may be any system able to implement the examples herein, such as personal computers, laptops, servers, smartphones, televisions, audio processing devices such as receivers, and the like. These are merely exemplary and not meant to be limiting.

Figure 2:
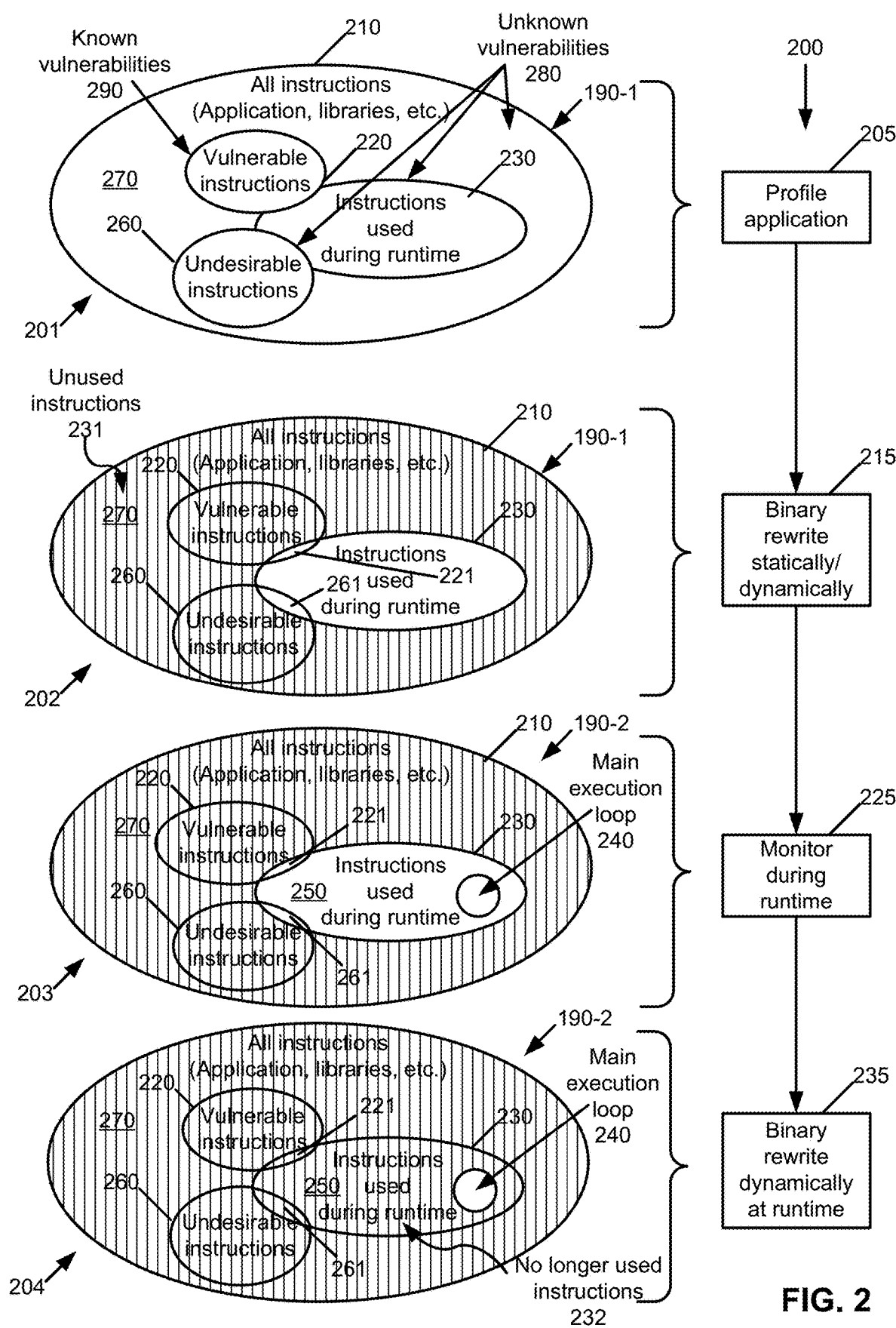
FIG. 2 is an example of a flowchart for application binary hardening through application binary rewriting and illustrates via Venn diagrams effects on instructions caused by the blocks in the flowchart, in an exemplary embodiment.

Turning to FIG. 2, this figure is an example of a flowchart 200 for application binary hardening through application binary rewriting and illustrates, via Venn diagrams, effects on instructions caused by blocks in the flowchart. Application binary rewriting (also called "binary rewriting") is a technique for changing behavior of a program by directly changing a compiled image (a binary) of an application rather than source code of the application. In this work, the application binary rewriting is not seeking to change the behavior of the application, but to remove unused or no longer used instructions from the application. The flowchart 200 is on the right-hand side and has blocks 205, 215, 225, and 235, which are major operations in the flow. As such, FIG. 2 provides an introduction to exemplary techniques for application binary rewriting to reduce binary attack surface area. On the left-hand side are Venn diagrams 201, 202, 203, and 204, corresponding to blocks 205, 215, 225, and 235, respectively. These Venn diagrams illustrate how binary rewriting reduces binary attack surface area. The blocks are assumed to be performed by the computer system 100 under control at least in part by the binary rewriting application 110, and the blocks illustrate the operation of an exemplary method or methods, a result of execution of computer program instructions embodied on a computer readable memory, functions performed by logic implemented in hardware, and/or interconnected means for performing functions in accordance with exemplary embodiments.

The flow for flowchart 200 begins with block 205, where the computer system 100 profiles the application in order to discover and determine all instructions 210, which are all instructions capable of being reached by the target application binary 190 (e.g., the file version 190-1), such as application instructions, instructions for libraries, and the like. For this block, the Venn diagram 201 includes all instructions 210. All instructions 210 include known vulnerabilities 290 and unknown vulnerabilities 280. Known vulnerabilities 290 may be determined using (e.g., published) common vulnerabilities and exposures (CVEs) or (e.g., published) bug reports or other sources. The known vulnerabilities 290 include vulnerable instructions 220, e.g., which may be used to exploit the known vulnerabilities. The unknown vulnerabilities 280 are vulnerabilities not published but known to an attacker or simply not known at a specific time. The unknown vulnerabilities 280 include undesirable instructions 260, instructions used during runtime 230, and instructions 270 that are in the all instructions 210 but not in vulnerable instructions 220, undesirable instructions 260, and instructions used during runtime 230. The undesirable instructions 260 are instructions that belong to features that can be unsafe in certain situations, thus it is desirable to disable these instructions. They do not necessarily have known vulnerabilities but are potentially unsafe, e.g., provide access to the file system, password-based authentication, and the like.

In block 215, the computer system 100 performs binary rewriting statically. By this, it is meant that the application binary rewriting occurs statically, that is without execution of the target application binary 190-1. Note that this rewriting likely would occur by rewriting the binary for target application binary 190-1, stored in a file format of secondary memory 122. This phase can be performed dynamically also as an alternative approach. In the dynamic case, the binary rewriting would occur in response to the application being loaded into memory but before executing the first instruction of the application. Specifically, the tracing/debugging program will load the target application binary into volatile memory (e.g., main memory 121), binary rewriting would occur to the target application 190-2 by the tracing/debugging program before executing instructions in the target application. This dynamic approach does not change the application binary 190-1 as it resided in the secondary memory 122.

As can be seen by the shading in Venn diagram 202, the static binary rewriting by the computer system 100 causes unused instructions 231, comprising the instructions 270, part of the vulnerable instructions 220, and part of the undesirable instructions 260, to be removed from possible execution (during execution of the application) and therefore there is a reduced binary attack surface area, as only instructions used during runtime 230 remain and the unused instructions 231 are rewritten. That is, these unused instructions 231 are prevented from being executed during a subsequent execution of the target application binary 190-1. Such removal from execution could be performed by overwriting the instructions, as explained below. The partial removal of vulnerable instructions 220 means that the vulnerable instructions 221, which are part of the instructions used during runtime 230, remain. Similarly, partial removal of undesirable instructions 260 means that the undesirable instructions 261, which are part of the instructions used during runtime 230, remain. Note that this is only one representation: it might be possible that one or both of the vulnerable instructions 220 and undesirable instructions 260 would no longer be in the instructions used during runtime 230 after block 215 is performed. That is, it is possible there would be no vulnerable instructions 221 and/or undesirable instructions 261 after block 215 is performed.

The computer system 100 in block 225 monitors application execution during runtime (that is, when the target application binary 190-2 is actually executed by the one or more processors 130 of the computer system 100). This means the instructions used during runtime 230 (also called "runtime instructions") are those instructions that may be accessed by the main execution loop 240 during runtime. The runtime instructions 230 are loaded into main memory 121, e.g., in the allocated memory space 125. The overwritten (by block 215) instructions in 210 are also loaded into main memory 121. The instructions 250 are those instructions in the instructions used during runtime 230 but not contained in the main execution loop 240.

In block 235, the computer system 100 performs a binary rewriting dynamically at runtime of the target application binary 190-2 in the main memory 121. What this means is that only instructions needed, e.g., in the main execution loop 240 are kept in main memory 121 (e.g., in the allocated memory space 125) and no longer used instructions 232 are rewritten (e.g., overwritten). That is, the memory locations of all other instructions not in main execution loop 240, no longer used instructions 232, are overwritten. This includes instructions in 250 and also in the main execution loop 240 that have been executed and will not be used again, and these are subject to binary rewriting in block 235. See, e.g., FIGS. 5A and 5B and their descriptions below. This application binary rewriting further reduces binary attack surface area. It is noted the Venn diagram 204 is "ideal" in the sense that the (e.g., part of the) main execution loop 240 that remains in the main memory 121 does not contain either the vulnerable instructions 221 or the undesirable instructions 261. This might not be the case, however.

FIG. 2A is another version of Venn diagram 204 of FIG. 2, shown in another example. In the example of FIG. 2A, portions of one or both of the vulnerable instructions 221 and undesirable instructions 261 are part of the main execution loop 240. While this is not "ideal", there is still a reduced binary attack surface area.

Referring to FIG. 3, this figure is split into FIGS. 3A and 3B, and is a block diagram of a flowchart of application binary rewriting to reduce binary attack surface area, in an exemplary embodiment. The blocks are assumed to be performed by the computer system 100 under control at least in part by the binary rewriting application 110, and the blocks illustrate the operation of an exemplary method or methods, a result of execution of computer program instructions embodied on a computer readable memory, functions performed by logic implemented in hardware, and/or interconnected means for performing functions in accordance with exemplary embodiments.

For FIG. 3A, this is divided into the major blocks of creating a CFG (control flow graph) of a target application binary in block 315 and statically removing unused code (unused instructions 231) in block 320. Blocks 301 to 304 are examples of creating a CFG of a target application binary 190 (e.g., 190-1, in the secondary memory) in block 315. Block 305 is an example of statically removing unused code in block 320. Note that block 205 from FIG. 2 is implemented in this example as block 315, and block 215 of FIG. 2 is implemented in this example as block 320.

A control flow graph (CFG) is a directed graph where nodes are code sequences and edges are control directions, and describes sequences of operations a program can take. The CFG is one possible way of profiling an application as in block 315 of FIG. 3, and the techniques here are not limited to this particular technique.

The computer system 100 in block 301 of FIG. 3A traces the target application binary, e.g., by using a common tracing program 112 such as Pintools or Ptrace. In general, program tracing is a technique whereby a separate program (that is, a program 112 separate from the target application binary 190) monitors, intercepts, and possibly manipulates the execution of the target application binary 190. With specific regard to Pintools, Pin is a dynamic binary instrumentation framework that enables the creation of dynamic program analysis tools. The tools created using Pin, called Pintools, can be used to perform program analysis on user space applications. As a dynamic binary instrumentation tool, instrumentation is performed at run time on the compiled binary files. Thus, Pin requires no recompiling of source code and can support instrumenting programs that dynamically generate code. Regarding specifically Ptrace, the ptrace( ) system call provides a means by which one process (the "tracer") may observe and control the execution of another process (the "tracee"), and examine and change the tracee's memory and registers. Ptrace is primarily used to implement breakpoint debugging and system call tracing. These are merely examples of tracing programs, and other tracing programs may be used.

In block 302, the computer system 100 executes the target application binary 190 with tracing enabled to create the CFG at BB (basic block) granularity. A Basic Block (BB) is a straight-line code sequence where there is only one entry and one exit. In block 303, the computer system 100 processes the CFG to identify all nodes (e.g., BBs) that belong in loops using one or more existing algorithms (e.g., in order to determine strongly connected components, which are, e.g., the loops shown in FIGS. 5A and 5B). Possible algorithms include one or more of the following: Kosaraju's algorithm; Tarjan's strongly connected components algorithm; and path-based strong component algorithm.

The computer system 100 in block 304 records all BBs that are at beginning of loops. The output of this operation is used in FIG. 3B.

In block 305, for all BBs not in the CFG, the computer system 100 statically performs binary rewriting by overwriting instructions in BBs with noop (no operation) instructions or trap instructions. That is, the instructions in the BBs that are not in the CFG are overwritten with these instructions. The trap instructions (such as invalidOp) are instructions intended to crash the application or alert an admin. More specifically, the outcome of a trap instruction is that the tracing program 112 would perform exception handling in response to execution of the trap instruction, and the tracing program 112 would then cause a crash of the application or send an alert to an admin.

For FIG. 3B, this has a major block 330 of dynamically removing no longer used code (that is, no longer used instructions 232). Blocks 306 to 310 are examples of dynamically removing the no longer used instructions 232 in block 330. Note that block 215 from FIG. 2 is implemented in this example as block 305', block 225 from FIG. 2 is implemented in this example as blocks 306 to 309, and block 235 of FIG. 2 is implemented in this example as block 310.

In block 305' of FIG. 3B, this is one illustration of block 215 of FIG. 2. In this dynamic case, the binary rewriting would occur dynamically in response to the application being loaded into memory but before executing the first instruction of the application, instead of statically performing this rewriting. This operation will be performed by, e.g., a tracing program 112/debugger 111. In more detail and in an exemplary embodiment, the tracing/debugging program would load the target application into volatile memory (main memory 121), the tracing/debugging program performs the rewrite of application binary residing in volatile memory, then executes the application code. The changes only occur to the binary 190-2 in volatile memory (main memory 121) but do not affect the binary 190-1 in non-volatile memory (secondary memory 122). Meaning the next time the application binary 190 is loaded (e.g., in block 305' of FIG. 3B), the rewriting is performed again. Note in the static rewriting case (block 305 of FIG. 3A), changes are made to the non-volatile binary 190-1, hence the changes will be there every time the application 190 is loaded into volatile memory (main memory 121) for execution.

In block 306 of FIG. 3B, the computer system 100 executes the target application binary 190-2 (e.g., while) using a tracing program 112 or a debugger 111 (such as Radare2). It is possible that the tracing program 112 or debugger 111 causes (e.g., under control of the binary rewriting application 110) execution of the target application binary 190-2. It is also possible that the target application binary 190-2 executes (e.g., under control of the binary rewriting application 110) and the tracing program 112 or debugger 111 executes in parallel with the execution of the target application binary 190-2.

The computer system 100 in block 307 sets breakpoints or trap instructions on locations recorded in block 304 (of FIG. 3A). A trap instruction is an instruction placed at the locations recorded in the code of the target application binary 190-2. Meanwhile, a breakpoint is an indication to the tracing program 112 or debugger 111 to interrupt process execution at the locations recorded in the code of the target application binary 190-2. In block 308, when execution reaches locations recorded in block 304, the tracing program 112 or debugger 111 takes over.

The computer system 100 in block 309 has the tracing program 112 or the debugger 111 identifies BB candidates for elimination. That is, all BBs are identified that are not reachable from a current (e.g., recorded) BB.

In block 310, the computer system 100 overwrites instructions from BB candidates identified in block 309 with noop or trap instructions. As previously described, the trap instructions (such as invalidOp) are instructions intended to crash the application or alert an admin. More specifically, the outcome of a trap instruction is that the tracing program 112 would perform exception handling in response to execution of the trap instruction, and the tracing program 112 would then cause a crash of the application or send an alert to an admin.

Figure 4:
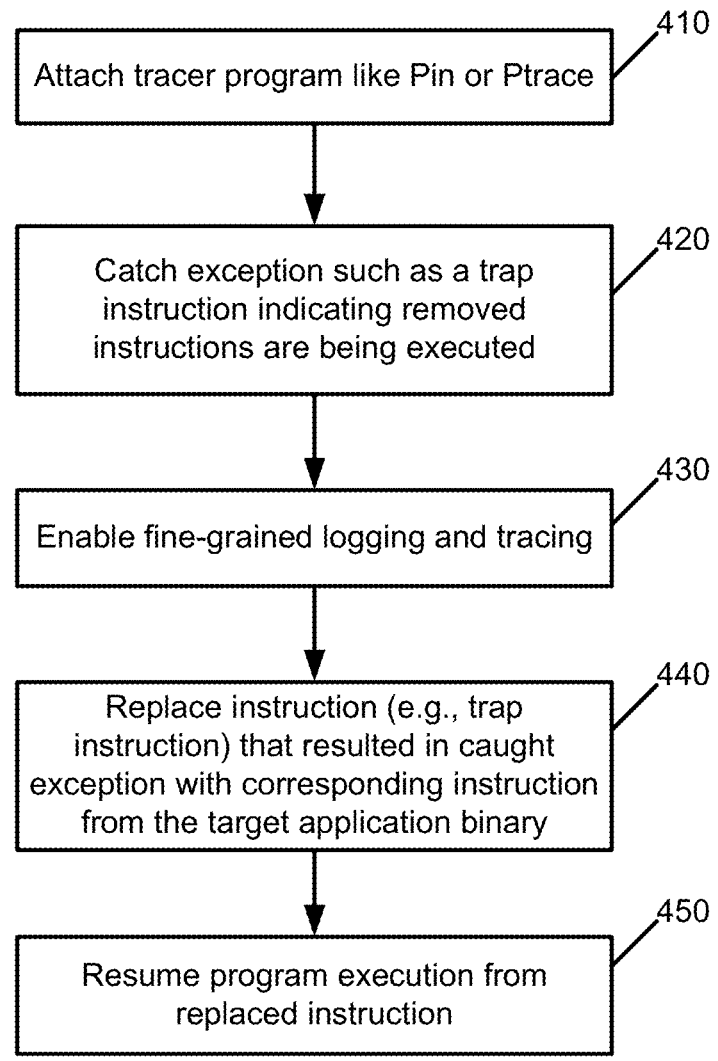
FIG. 4 is a block diagram of a flowchart for handling false-positives in an exemplary embodiment.

Turning to FIG. 4, this figure is a block diagram of a flowchart for handling false-positives in an exemplary embodiment. FIG. 4 illustrates one way of handling false-positives (removed code legitimately needed) gracefully and securely. The blocks are assumed to be performed by the computer system 100 under control at least in part by the binary rewriting application 110, and the blocks illustrate the operation of an exemplary method or methods, a result of execution of computer program instructions embodied on a computer readable memory, functions performed by logic implemented in hardware, and/or interconnected means for performing functions in accordance with exemplary embodiments.

The computer system 100 in block 410 attaches a tracer program like Pin or Ptrace to the target application binary prior to execution. Note that this would likely be done in block 306 of FIG. 3B. In block 420, the computer system 100 catches an exception such as a trap instruction indicating removed instructions are being executed.

In block 430, the computer system 100 enables fine-grained logging and tracing, such as monitoring system calls, network traffic, and file access patterns of the application. The intent of fine-grained logging and tracing is to improve logging of the activities of the application in case the application is doing something malicious. That is, this is a safety mechanism. These types of detailed (fine-grained) logging might be too expensive normally otherwise. In more detail, it is beneficial to enable some form of detailed logging along potentially with sandboxing because the instructions being brought back may be caused by a legitimate benign execution path that was missed while profiling, or could be caused by an attacker trying to perform a code-reuse attack. It is unknown which, therefore, the logging provides for further analysis. This further analysis is not described herein, but may be performed in multiple ways. For instance, it can be performed as a subsystem to box 430. Once the fine-grained logging is enabled, some other subsystem can be invoked as part of that enablement to perform some analytics on the behavior of the application going forward.

The computer system 100 in block 440 replaces the instruction (e.g., the trap instruction) that caused the caught exception with a corresponding instruction from the target application binary 190. That is, the instruction that was overwritten in block 235/320/305 is fetched (e.g., from the secondary memory 122 and from target application binary 190-1) and placed into the main memory 121 for execution. The computer system 100 in block 450 resumes program execution from the replaced instruction. It is noted that FIG. 4 operates on a single instructions. That is, it is possible to replace one instruction at a time. Multiple instructions could instead be replaced, such as replacing the instructions for a BB as well. This then handles false-positives securely, due to the fine-grained logging and possibly sandboxing. The false-positives are handled gracefully because of the instruction replacement and not letting the program crash.

Referring to FIGS. 5A and 5B, these figures are illustrations of loop detection and code elimination, in accordance with exemplary embodiments. Each small filled-in circle is a basic block (BB). The arrows between BBs indicate possible program flow. Each of letters A, B, C, D, and E indicates a loop 500 of one or more BBs, and the BB at the beginning of each of the loops 500 would be recorded in block 304 of FIG. 3A. The blocks illustrated in FIGS. 5A and 5B may be thought of as applications of block 309 (where a tracing program identifies BB candidates for elimination, such as all BBs that are not reachable from a current BB) and also block 310 (where instructions from BB candidates identified in block 309 are overwritten with noop or trap instructions).

In FIG. 5A, there are five loops 500-1, 500-2, 500-3, 500-4, and 500-5. Loop 500-1 contains three BBs. Loop 500-4 contains two BBs, and each of loops 500-2, 500-3, and 500-5 contain single BBs. In block 510, the computer system 100, in response to C being reached, overwrites A and B. In response to B being reached, the computer system 100 would overwrite A, C, D, and E in block 520. Similarly, in block 530, in response to D being reached, the computer system would overwrite C, and in block 540, the computer system 100 would, in response to E being reached, overwrite D.

In FIG. 5B, there are fewer loops represented than in FIG. 5A: there are three loops 500-6, 500-3, and 500-5, each corresponding to one of A, B, or C, respectively, instead of the five loops 500-1 through 500-5 in FIG. 5A. The loop 500-6 contains loops 500-1, 500-2, and 500-4, but only loop 500-6 is considered in this example. In block 550, the computer system 100, in response to B being reached, overwrites A and C. Similarly, the computer system 100 in block 560, in response to C being reached, overwrites A and B. This figure illustrates an efficiency, which is that larger loops can be handled more efficiently than breaking a larger loop into small loops. For instance, the loop 500-6 could also be broken into loops 500-1, 500-2, and 500-4 (in addition to loop 500-6). However, if the branch at the bottom of loop 500-4 is taken to the top of loop 500-1, the loops 500-1 and 500-2 would have been overwritten and would need to be reloaded, e.g., using the techniques in FIG. 4. This could be inefficient, as compared to making loop 500-6, which would only be overwritten once program flow has reached loop 500-5 (C).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
    determining unused first instructions in a target application binary;
    rewriting the target application binary to reduce binary attack surface area for a runtime execution of the target application binary, comprising performing a first rewriting of the target application binary to overwrite the unused first instructions to remove the unused first instructions;
    wherein the first rewriting is by performing a first dynamic rewriting of an original version of the target application binary residing in a volatile main memory during the runtime execution to reduce the binary attack surface area of the target application binary;
    wherein the first dynamic rewriting of the original version of the target application binary during the runtime execution to remove the unused first instructions is performed on the original version of the target application binary residing in the volatile main memory, by rewriting, using a tracing or debugging program to remove the unused first instructions following identifying, by the tracing or debugging program, the unused first instructions for removal, the original version of the target application binary residing in the volatile main memory, in response to the target application binary being loaded into the volatile main memory before executing the target application binary; and
    determining no longer used second instructions in the target application binary;
    wherein rewriting the target application binary further comprises performing a second rewriting of the target application binary after the first rewriting to further reduce the binary attack surface area of the target application binary, the second rewriting comprising overwriting and removing the no longer used second instructions using the tracing or debugging program following identifying, by the tracing or debugging program, the no longer used second instructions for removal.

2. The method of claim 1, wherein: determining the no longer used second instructions in the target application binary comprises monitoring the target application binary during the runtime execution to determine the no longer used second instructions to remove from a set of runtime instructions; and
    the second rewriting of the target application binary comprises a second dynamic rewriting of the target application binary residing in the volatile main memory during the runtime execution to overwrite the no longer used second instructions.

3. The method of claim 1, further comprising profiling the target application binary to determine the unused first instructions, comprising: tracing the target application binary during an execution of the target application binary to create a control flow graph of the target application binary, the control flow graph describing a sequence of operation of an unmodified version of the target application binary; processing, using one or more algorithms, the control flow graph to identify all nodes that belong in loops; and recording all basic blocks that are at beginnings of the loops.

4. The method of claim 3, wherein the performing the first rewriting of the target application binary further comprises: overwriting instructions in all basic blocks not in the control flow graph with no operation instructions or trap instructions.

5. The method of claim 2, wherein monitoring the target application binary during the runtime execution to determine the no longer used second instructions further comprises: in response to the runtime execution of the target application binary reaching recorded basic blocks at beginning of loops, identifying basic block candidates for elimination as all basic blocks not reachable from a current recorded basic block.

6. The method of claim 5, wherein monitoring the target application binary during the runtime execution to determine the no longer used second instructions further comprises: executing the target application binary; determining whether the recorded basic blocks are reached or not reached; and performing the identifying basic block candidates in response to a determination that the recorded basic blocks are reached or not reached.

7. The method of claim 6, wherein: the determining whether the recorded basic blocks are reached further comprises setting trap instructions or breakpoints on the recorded basic blocks and determining whether the recorded basic blocks are reached in response to the trap instructions or breakpoints being reached; and the no longer used second instructions comprise the basic blocks that are not reached.

8. The method of claim 5, wherein the second dynamic rewriting of the target application binary during the runtime execution to remove the no longer used second instructions further comprises:
    overwriting instructions from the identified basic block candidates with no operation or trap instructions.

9. The method of claim 1, further comprising performing the following during a subsequent runtime execution of the target application binary residing in the volatile main memory, following the first rewriting or the second rewriting to handle replacement of instructions falsely identified as the unused first instructions or the no longer used second instructions:
    catching an exception caused by a trap instruction indicating one or more removed instructions of the target application binary residing in the volatile main memory are to be executed; replacing the one or more removed instructions of the target application binary residing in the volatile main memory that resulted in the caught exception caused by the trap instruction with one or more corresponding instructions from a version of the target application binary residing in a secondary memory; and resuming program execution from the replaced one or more instructions of the target application binary residing in the volatile main memory.

10. The method of claim 9, wherein replacing the instruction replaces multiple instructions in a basic block, wherein the basic block was previously overwritten by the instruction that resulted in the caught exception and was overwritten by other instructions.

11. The method of claim 2, wherein the second dynamic rewriting of the target application binary during the runtime execution to remove the no longer used second instructions further comprises; determining during the runtime execution, loops in the target application binary; and for loops not reachable from a current loop being executed, overwriting the loops that are not reachable from a current loop being executed with no operation instructions or trap instructions.

12. A computer system, comprising:
one or more non-transitory memories comprising computer readable code; and
one or more processors, the one or more processors causing the computer system, in response to retrieval from the one or more memories and execution of the computer readable code, to perform operations comprising:
determining unused first instructions in a target application binary;
rewriting the target application binary to reduce binary attack surface area for a runtime execution of the target application binary, comprising performing a first rewriting of the target application binary to overwrite the unused first instructions to remove the unused first instructions;
wherein the first rewriting is performed by performing a first dynamic rewriting of an original version of the target application binary residing in a volatile main memory during the runtime execution of the target application binary to reduce the binary attack surface area of the target application binary;
wherein the first dynamic rewriting of the original version of the target application binary to remove the unused first instructions is performed on the original version of the target application binary residing in the volatile main memory, by rewriting, using a tracing or debugging program to remove the unused first instructions following identifying, by the tracing or debugging program, the unused first instructions for removal, the original target application binary residing in the volatile main memory, in response to the target application being loaded into the volatile main memory before executing the target application binary; and
determining no longer used second instructions in the target application binary;
wherein rewriting the target application binary further comprises performing a second rewriting of the target application binary after the first rewriting to further reduce the binary attack surface area of the target application binary, the second rewriting comprising overwriting and removing the no longer second instructions using the tracing or debugging program to remove the no longer used second instructions following identifying, by the tracing or debugging program, the no longer used second instructions for removal.

13. The computer system of claim 12, wherein:
determining the no longer used second instructions in the target application binary comprises monitoring the target application binary during the runtime execution to determine the no longer used second instructions to remove a set of runtime instructions; and
the second rewriting of the target application binary comprises a second dynamic rewriting of the target application binary residing in the volatile main memory during the runtime execution to overwrite the no longer used second instructions.

14. The computer system of claim 12, further comprising profiling the target application binary to determine the unused first instructions, comprising:
tracing the target application binary during an execution of the target application binary to create a control flow graph of the target application binary, the control flow graph describing a sequence of operations of an unmodified version of the target application binary;
processing, using one or more algorithms, the control flow graph to identify all nodes that belong in loops; and
recording all basic blocks that are at beginnings of the bops.

15. The computer system of claim 13, wherein the second dynamic rewriting of the target application binary to remove the no longer used second instructions further comprises:
determining during the runtime execution loops in the target application binary; and for loops not reachable from a current loop being executed, overwriting the loops that are not reachable from a current loop being executed with no operation instructions or trap instructions.

16. A computer program product comprising a computer readable storage medium having program instructions embodied therewith, the program instructions executable by a computer system to cause the computer system to perform operations comprising:
determining unused first instructions in a target application binary;
rewriting the target application binary to reduce binary attack surface area for a runtime execution of the target application binary, comprising performing a first rewriting of the target application binary to overwrite the unused first instructions to remove the unused first instructions;
wherein the first rewriting is performed by performing a first dynamic rewriting of an original version of the target application binary residing in a volatile main memory during the runtime execution of the target application binary;
wherein the first dynamic rewriting of the original target application binary during the runtime execution to remove the unused first instructions is performed on the original version of the target application binary residing in the volatile main memory, by rewriting the original version of the target application binary residing in the volatile main memory, in response to the target application binary being loaded into the volatile main memory before executing the target application binary; and
determining no longer used second instructions in the target application binary;
wherein rewriting the target application binary further comprises performing a second rewriting of the target application binary to overwrite and remove the no longer used second instructions;

determining whether the unused first instructions or the no longer used second instructions are legitimately needed; and replacing the unused first instructions or the no longer used second instructions that are legitimately needed but removed within the target application binary.

17. The method of claim 1, wherein a version of the target application binary residing in a secondary memory is non-volatile.

18. The method of claim 1, wherein the first dynamic rewriting of the target application binary during the runtime execution is performed on the target application binary residing in the volatile main memory without changing the target application binary residing in a secondary memory.

19. The method of claim 1, wherein the first dynamic rewriting of the target application binary during the runtime execution is performed on the target application binary residing in the volatile main memory in response to the target application binary being loaded into the volatile main memory by the tracing or debugging program.

20. The method of claim 1, wherein:

the unused first instructions comprise:

instructions not invoked by the target application binary during the runtime execution; and the no longer used second instructions comprise:

instructions that are not in a main execution loop of the target application binary; and instructions in the main execution loop that are not accessed again.

21. The method of claim 1, wherein determining the no longer used second instructions comprises:

performing a first execution of the target application binary to create a control flow graph of an unmodified target application binary;

recording a plurality of basic blocks that are at a respective beginning of a respective loop within the control flow graph to generate a set of recorded basic blocks;

performing a second execution of the target application binary;

identifying, during the second execution of the target application binary, basic blocks that are not reached from the set of recorded basic blocks; and determining the no longer used second instructions to be the identified basic blocks that are not reached from the set of recorded basic blocks.

22. The method of claim 1, wherein the first rewriting and the second rewriting do not require source code or recompilation.

* * * * *